United States Patent [19]

Reel et al.

[11] Patent Number: 4,790,431
[45] Date of Patent: Dec. 13, 1988

[54] CARRYING CASE FOR STORING A COMPUTER AND A PRINTER OPERATIVELY CONNECTED THERETO

[75] Inventor: James W. Reel; James R. Simpson, both of Atlanta, Ga.

[73] Assignee: International Computer Marketing Corporation, Norcross, Ga.

[21] Appl. No.: 32,386

[22] Filed: Mar. 31, 1987

[51] Int. Cl.⁴ .................. B65D 85/38; G06F 15/02
[52] U.S. Cl. ........................ 206/305; 150/52 R; 190/109; 206/232; 206/371; 206/523; 206/576; 312/208; 361/394; 364/705.01; 364/705.03; 400/613.2
[58] Field of Search ............... 206/305, 320, 349, 371, 206/373, 526, 576, 521–524, 232; 190/109; 312/196, 212, 208, 241, 244, 237, 117; 361/393, 394; 364/708, 709, 705; 400/613, 613.2, 691, 693, 680–685; 150/52 R

[56] References Cited

U.S. PATENT DOCUMENTS

| | | | |
|---|---|---|---|
| 3,136,408 | 6/1964 | Rockmann | 206/576 |
| 3,243,037 | 3/1966 | Luertzing | 206/523 X |
| 3,347,354 | 10/1967 | West | 206/523 X |
| 4,027,140 | 5/1977 | Fowler et al. | 364/708 X |
| 4,084,214 | 4/1978 | Eppich | 361/394 |
| 4,372,694 | 2/1983 | Bovio et al. | 364/708 |
| 4,379,336 | 4/1983 | Yamamoto et al. | 364/708 |
| 4,409,467 | 10/1983 | Honjo | 235/58 CF |
| 4,458,813 | 7/1984 | Tushinsky et al. | 206/320 |
| 4,496,943 | 1/1985 | Greenblatt | 340/711 |
| 4,497,036 | 1/1985 | Dunn | 364/708 |
| 4,645,275 | 2/1987 | Pucci | 312/208 X |
| 4,658,956 | 4/1987 | Takeda et al. | 206/320 |

FOREIGN PATENT DOCUMENTS

| | | | |
|---|---|---|---|
| 2370450 | 7/1978 | France | 206/305 |
| 0066988 | 4/1982 | Japan | 400/691 |
| 0075881 | 5/1982 | Japan | 400/613.2 |
| 0087385 | 5/1982 | Japan | 400/613.2 |
| 0167016 | 8/1985 | Japan | 364/708 |
| 2046671 | 11/1980 | United Kingdom | 400/613.2 |

Primary Examiner—Stephen Marcus
Assistant Examiner—Bryon Gehman
Attorney, Agent, or Firm—Wenderoth, Lind & Ponack

[57] ABSTRACT

A carrying case for storing a computer and a printer operatively connected together for use thereof without removing the printer or computer from the carrying case. The carrying case includes a case formed in two parts which are pivotally connected together along one side of the case by hinges which allow removal of one part of the case from the other, a mechanism for closing the case, a handle for carrying the case, a computer removably fitted in the case, a printer removably fitted in the case and operatively connected to the computer for use together without removing either the computer or the printer from the case, an insert for positioning the computer and the printer in the case and also defining a paper storage space for receiving paper and guiding the paper as it is withdrawn by the printer during a printing operation. The paper can be folded paper which is stored in the paper storage space and which is unfolded as it is withdrawn by the printer during a printing operation.

19 Claims, 3 Drawing Sheets

CARRYING CASE FOR STORING A COMPUTER AND A PRINTER OPERATIVELY CONNECTED THERETO

BACKGROUND OF THE INVENTION

1. Field of the Invention

The present invention relates to a carrying case for storing a computer and a printer operatively connected thereto for use thereof without removing either the printer or computer from the carrying case.

2. Description of the Prior Art

Various combinations of personal computers and printers are known which are useable with each other. Carrying cases are available for storing the individual printers and personal computers but it is necessary to remove the components from their carrying cases and connect them together by suitable connection means which is inconvenient since these components must be placed on a suitable support surface prior to operation thereof. Furthermore, a printer using folded sheet paper must be positioned alongside a stack of folded paper with the top sheet of the paper being inserted into the printer. Thus, the connection of the computer to the printer in addition to placing paper in the printer is time consuming and distracting to prospective customers during a sales presentation.

An object of the present invention is to overcome the above mentioned problems with the operation of a computer and printer.

SUMMARY OF THE INVENTION

An object of the present invention is to provide a carrying case for storing a computer and a printer operatively connected thereto for use thereof in the carrying case. The carrying case includes a case formed in two parts which are pivotally connected together along one side of the case, closure means disposed on the other side of the case for removably securing the two parts together, handle means disposed on the case for single-handed portability of the case, a computer removably fitted in the case, a printer removably fitted in the case and operatively connected to the computer for use together without removing either the computer or the printer from the case, paper storage means disposed in the case for receiving paper and guiding the paper as it is withdrawn by the printer during a printing operation and insert means for positioning the computer and the printer in the case.

A further object of the present invention is to provide a carrying case wherein the paper storage means accommodates a stack of folded paper and guides a continuous sheet of the folded paper as it is unfolded and withdrawn by the printer during a printing operation.

The insert means of the present invention can comprise a foam insert which is made up of one or more members which are glued to the inside of the case. Furthermore, the insert means can comprise one or more inserts of compressible material, such as foam, which cooperate to define the paper storage means and position the computer and the printer in the case. Furthermore, the insert means can include storage spaces for accommodating rechargers for the computer and the printer. Preferably, the printer and the computer each include a built-in rechargeable power supply.

The insert means of the present invention includes a pair of spaced-apart computer support members disposed adjacent opposite inner walls of the case with the space between the computer support members defining the paper storage means. The insert means can further include a printer support member disposed between the opposite inner walls of the case. Also, the insert means includes a separator member along the opposite inner walls of the case and along opposite inner end walls of the case with the separator member being disposed between the computer support members and the inner walls of the case and further, the separator member has a height in a direction perpendicular to the bottom surface of the case which is greater than the height of the computer support members. The separator member is further disposed between the printer support member and at least one inner wall of the case and the separator member has an upper surface thereof separated from the bottom surface of the case by a distance greater than the distance between the upper surface of the printer support member and the bottom surface of the case. The insert means also includes a spacer member disposed between an end of one of the computer support members and the printer support member with the spacer member being disposed along one of the opposite inner walls of the case. To allow proper feed of the paper from the paper storage means, the printer support member is disposed between the printer and a bottom surface of the case with the printer support member including a side thereof facing the paper storage means and extending vertically from the bottom surface of the case and abutting a bottom surface of the printer.

The computer removably fitted in the carrying case of the present invention preferably includes a rechargeable built-in power supply and a display screen which is pivotally attached to a portable personal computer body and the printer removably fitted in the carrying case of the present invention is preferably an ink-jet printer having a rechargeable built-in power supply.

IN THE DRAWINGS

The present invention will be described with reference to the accompanying drawings, in which.

Figure 4:
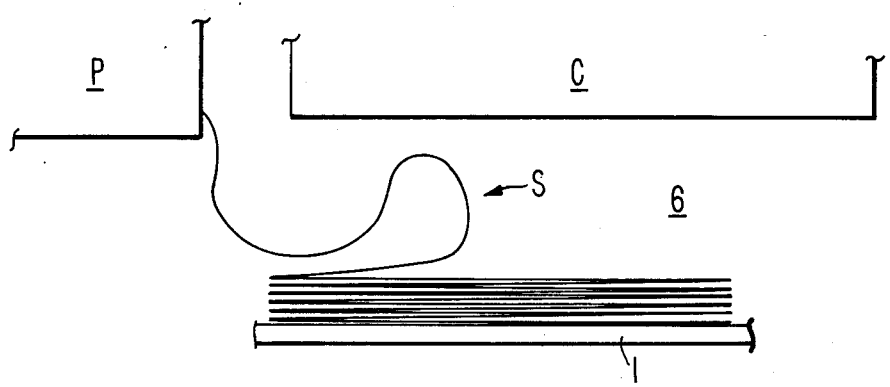
Figure 5:
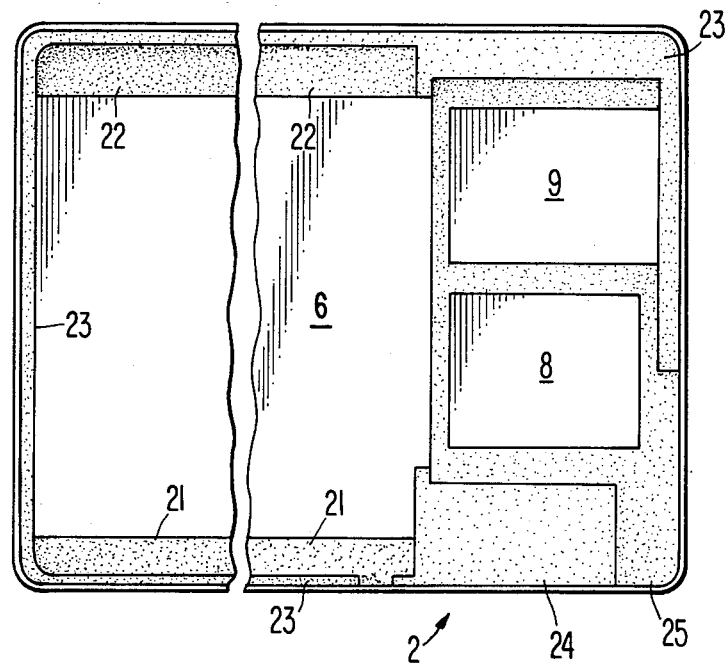

FIG. 4 schematically shows how the paper stored in the carrying case of the present invention is fed from the paper storage means to the printer;

FIG. 5 shows the insert means of the present invention; and

Figure 6:
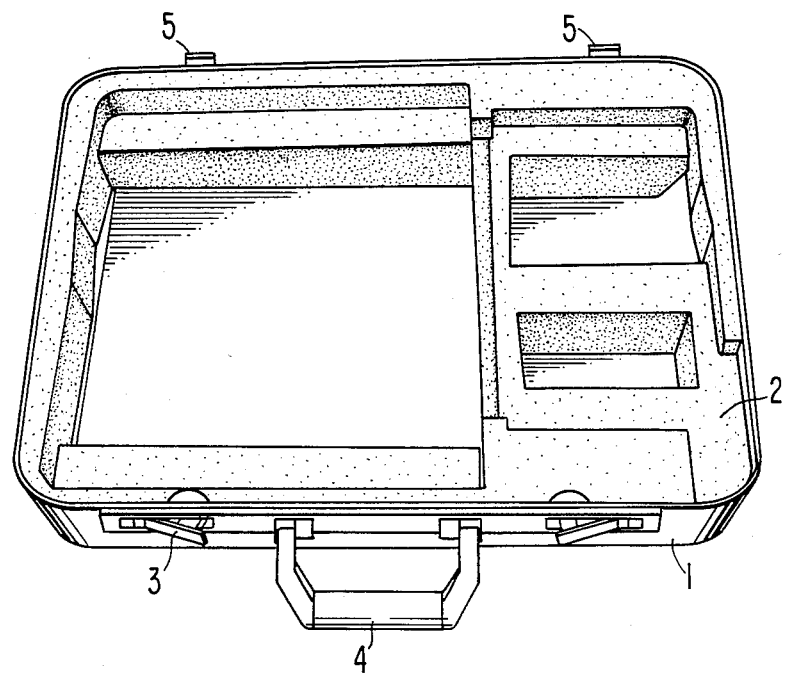

FIG. 6 is a perspective view of the carrying case of the present invention with the top part removed but further showing the hinge means, the closure means and the handle means attached to the case.

DETAILED DESCRIPTION OF THE PREFERRED EMBODIMENTS

Figure 2:
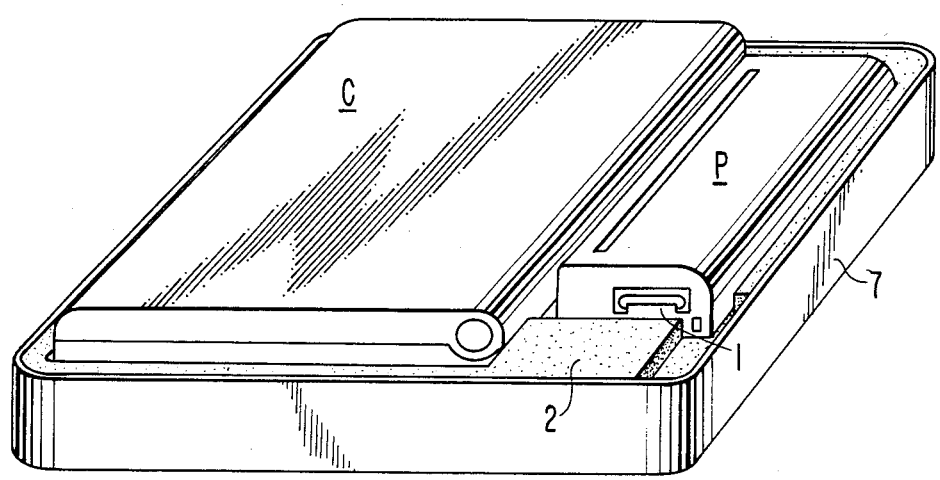
FIG. 2 shows the carrying case of the present invention with a computer and a printer removably fitted therein.
Figure 3:
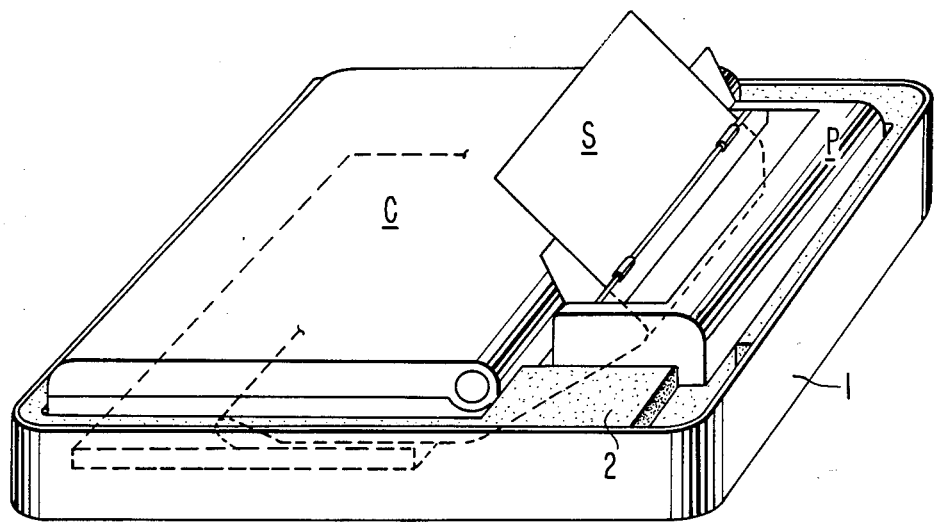
FIG. 3 shows the carrying case of the present invention wherein the printer is performing a printing operation.

According to the present invention, a carrying case 1 is provided for storing a computer C and a printer P operatively connected thereto for use together in the carrying case without removing either component therefrom. In particular, the case 1 can be formed in two parts which are pivotally connected together by suitable hinge means 5 along one side of the case which allows removal of one part of the case from the other part of the case, as shown in FIG. 6. Closure means 3, such as conventional locking mechanisms, can be provided on the other side of the case 1 for removably securing the two parts of the case together. Also, handle means 4, such as a conventional handle, is disposed on the case for single-handed portability of the case. The carrying case further includes insert means 2 for positioning a computer and a printer in the case with a space therebetween, as shown in FIG. 2. The carrying case includes paper storage means 6 for receiving paper and guiding the paper as it is withdrawn by the printer during a printing operation, as shown in FIG. 4. The printer P and the computer C are connected by suitable jack means 7, such as a cable having appropriate jacks fitted to respective connections in the computer C and the printer P, as shown in FIG. 2. It is particularly important in the present invention to provide jack means which connects the computer to the printer without interfering with the movement of the paper S from the paper storage means 6 to the printer P. As can be seen in FIG. 3, the carrying case of the present invention allows an operator to use the computer C and the printer P without removing either of them from the carrying case. This allows sales personnel to utilize the carrying case of the present invention by simply removing the upper part of the case 1 and operating the computer and the printer immediately without the need for removing each component, inserting paper into the printer, electrically connecting the computer to the printer and then operating the computer and printer, as is conventionally done. The carrying case of the present invention thus allows use of the computer and printer in the confined space of the carrying case itself which avoids disruption of the surrounding environment.

The paper storage means 6 of the present invention accommodates a stack of folded paper, as shown in FIGS. 3 and 4, and the paper storage means 6 comprises a space positioned beneath the computer which accommodates the stack of folded paper and guides a continuous sheet S of the folded paper such that the continuous sheet of paper forms a loop which passes through the space as it is unfolded and withdrawn by the printer P during a printing operation, as shown by dotted lines in FIG. 3 and as shown schematically in FIG. 4.

Figure 1:
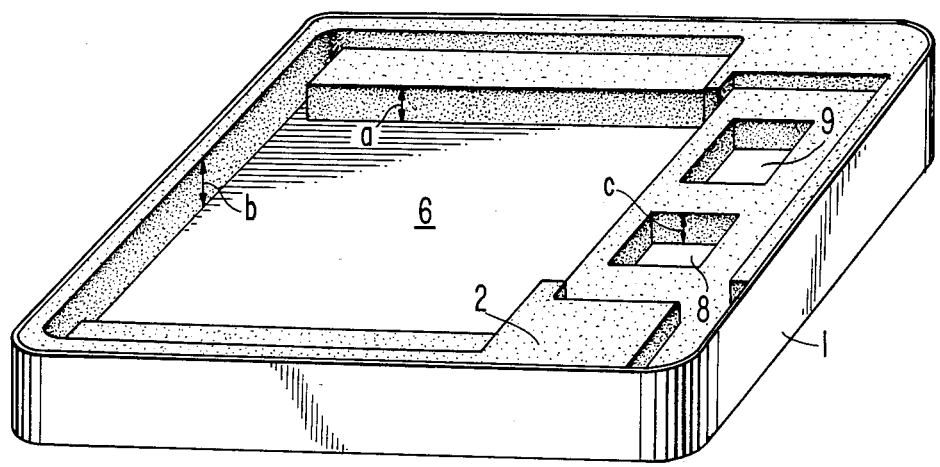
FIG. 1 is a perspective view of the carrying case of the present invention with the upper part of the case removed.

The insert means 2 can be made of a compressible material and in particular can comprise a foam insert made of one or more pieces. Preferably, the insert means comprises a plurality of foam pieces, each of which is die-cut into a suitable shape whereby the plurality of pieces can be assembled be securing them in the case 1 by suitable adhesive means to form the insert means 2. FIG. 1 shows the overall configuration of the insert means 2 and as can be seen from this figure, the insert means defines the paper storage means 6 and further includes spaces or openings 8 and 9 for receiving rechargers (not shown).

The insert means 2 will be described in more detail with reference to FIG. 5. As mentioned earlier, the insert means can comprise a plurality of foam inserts which cooperate to define the paper storage means 6 and position the computer C and the printer P in the case. The insert means includes a pair of spaced-apart computer support members 21 and 22 disposed adjacent opposite inner walls of the case 1, with the space defined between the computer support members 21 and 22 defining the paper storage means 6. The insert means further includes a printer support member 25 disposed between the opposite inner walls of the case 1. The printer support member includes at least one opening therein for storage of a recharger, and in particular two openings 8 and 9 can be provided for storage of rechargers for the computer C and the printer P. The printer support member 25 is disposed between the printer P and a bottom surface of the case 1. The printer support member 25 includes a side wall facing the paper storage means 6 and this side of the printer support member extends vertically from the bottom surface of the case and abuts a bottom surface of the printer. Thus, the printer P extends slightly beyond the side of the printer support member 25 facing the paper storage means 6 whereby a sheet S of the paper stored in the paper storage means 6 can be removed from a stack of folded paper without binding or misfeeding thereof.

The insert means 2 further includes a separator member 23 along the opposite inner walls of the case 1 and along opposite inner end walls of the case 1, as shown in FIG. 5. The separator member 23 is disposed between the computer support members 21 and 22 and the opposite inner walls of the case. The separator member 23 has a height in a direction perpendicular to a bottom surface of the case which is greater than the height in the same direction of the computer support members 21 and 22. The portion of the separator member 23 extending above the top surface of the computer support members 21 and 22 confines the computer C inwardly of the inner walls of the case. The separator member 23 can also be disposed between the printer support member 25 and at least one inner wall of the case with the separator member 23 having an upper surface thereof separated from the bottom surface of the case by a distance greater than the distance between the upper surface of the printer support member 25 and the bottom surface of the case. The insert means 2 further includes a spacer member 24 disposed between an end of one of the computer support members 21 and the printer support member 25, the spacer member being disposed along one of the opposite inner walls of the case 1. The separator member 23 and the spacer member 24 each include a part thereof fitted between the computer and the printer for maintaining adequate distance therebetween to prevent binding of the paper as it is fed to the printer. The case 1 can be formed of plastic, metal or other suitable material and the insert means 2 can be of compressible material such as foam, cork or other suitable material to provide shock protection to the computer C and the printer P.

The computer C preferably includes a display screen pivotally attached to a portable personal computer body and the printer P is preferably an ink-jet printer having a rechargeable built-in power supply. Also, the printer preferably includes an opening facing the computer for feeding paper into the printer. The computer also preferably includes a rechargeable built-in power supply.

The following is an example of the carrying case of the present invention.

The insert means 2 can be dimensioned to accommodate a portable personal computer such as the Zenith Z-181, Toshiba T1100 or the NEC Multi-Mate. If the Zenith Z-181 is used, the distance "a" between the bottom surface of the carrying case 1 and the top surface of the computer support members 21 and 22 should be at least $1\frac{7}{8}$ inches, as shown by "a" in FIG. 1. If the Toshiba T1100 or the NEC Multi-Mate is used, the distance "a" should be at least 2½ inches which will raise the height of the Toshiba T1100 and the NEC Multi-Mate computer enough above the bottom surface of the case 1 to access the disk drive components located on the side of these types of computers. The separator member 23 should have a height "b" of about 3½ inches and a width of about ⅜ inches. The printer support member 25 should have a height "c" from the bottom of the case 1 of about 2½ inches. A suitable printer for use with the present invention includes the Diconix 150, which is an ink-jet printer.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

I claim:

1. A carrying case for storing a computer and a printer operatively connected thereto for use thereof in the carrying case, comprising:
    a case formed in two parts which are pivotally connected together along one side of said case;
    closure means disposed on the other side of said case for removably securing said two parts together;
    handle means disposed on said case for single-handed portability of said case;
    a computer removably fitted in said case;
    a printer removably fitted in said case and operatively connectable to said computer for use together without removing either said computer or said printer from said case, said printer being discrete from said computer so as to be removable from said case without removing said computer from said case and said computer being removable from said case without removing said printer from said case;
    paper storage means discrete from the printer disposed in said case for receiving paper and guiding the paper as it is withdrawn by said printer during a printing operation while said printer is supported in said case, said paper storage means comprising a space positioned beneath said computer which accommodates a stack of folded paper and guides a continuous sheet of the folded paper such that the continuous sheet forms a loop which passes through said space as it is unfolded and withdrawn by said printer during a printing operation; and
    insert means for positioning said computer and said printer in said case.

2. The carrying case of claim 1, wherein said two parts of said case are detachably pivoted together by hinge means.

3. The carrying case of claim 1, wherein said insert means comprises at least one insert of compressible material.

4. The carrying case of claim 1, wherein said insert means comprises a plurality of inserts of compressible material which cooperate together to define said space and individually position said computer and said printer in said case.

5. The carrying case of claim 1, wherein said computer and said printer each include a built-in rechargeable power supply.

6. The carrying case of claim 5, wherein said insert means includes storage spaces for accommodating rechargers for said computer and said printer, respectively.

7. The carrying case of claim 1, wherein jack means operatively connects said printer to said computer, said jack means including a cable fitted between said printer and said insert means, said cable being connected to said computer and said printer without interfering with the movement of the paper from said paper storage means to said printer.

8. The carrying case of claim 1, wherein said insert means includes a pair of spaced-apart computer support members disposed adjacent opposite inner walls of said case, said computer support members defining therebetween said paper storage means.

9. The carrying case of claim 8, wherein said insert means further includes a printer support member disposed between said opposite inner walls of said case.

10. The carrying case of claim 9, wherein said insert means further includes a separator member along said opposite inner walls of said case and along opposite inner end walls of said case, said separator member being disposed between said computer support members and said opposite inner walls of said case and having a height in a direction perpendicular to a bottom surface of said case greater than the height in said direction of said computer support members.

11. The carrying case of claim 10, wherein said separator member is disposed between said printer support member and at least one inner wall of said case, said separator member having an upper surface thereof separated from said bottom surface of said case a distance greater than the distance between the upper surface of said printer support member and said bottom surface of said case.

12. The carrying case of claim 11, wherein said printer support member includes at least one opening therein for storage of a recharger.

13. The carrying case of claim 12, wherein said insert means further includes a spacer member disposed between an end of one of said computer support members and said printer support member, said spacer member being disposed along one of said opposite inner walls of said case.

14. The carrying case of claim 10, wherein said computer includes a display screen pivotally attached to a portable personal computer body.

15. The carrying case of claim 1, wherein said printer is an ink-jet printer having a rechargeable built-in power supply.

16. The carrying case of claim 1, wherein said insert means includes a printer support member disposed between said printer and a bottom surface of said case, said printer support member including a side thereof facing said paper storage means, said side of said printer support member extending vertically from said bottom surface of said case and abutting a bottom surface of said printer.

17. The carrying case of claim 1, wherein said printer includes an opening for feeding paper into said printer, said opening being disposed on a side of said printer facing said computer.

18. A carrying case for storing a computer and a printer operatively connected thereto for use thereof in the carrying case, comprising:
    a case formed in two parts which are pivotally connected together along one side of said case;
    closure means disposed on the other side of said case for removably securing said two parts together;
    handle means disposed on said case for single-handed portability of said case;

insert means for removably supporting a computer and a printer discrete from the computer in said case so that the computer and printer can be operatively connected together and used without removal thereof from said case, and paper storage means discrete from the printer disposed in said case for receiving folded paper and guiding the folded paper as it is unfolded and withdrawn by said printer during a printing operation while the printer is supported in said case, said paper storage means comprising a space positioned beneath said computer when the computer is supported in the case which accommodates a stack of folded paper and guides a continuous sheet of the folded paper such that the continuous sheet forms a loop which passes through said space as it is unfolded and withdrawn by said printer during a printing operation when the printer is supported in the case, said insert means comprising at least one foam insert which defines said space and positions said computer and said printer in said case.

19. A carrying case for storing a computer and a printer operatively connected thereto for use thereof in the carrying case, comprising:

a case formed in two parts which are pivotally connected together along one side of said case;

closure means disposed on the other side of said case for removably securing said two parts together;

handle means disposed on said case for single-handed portability of said case;

insert means for removably supporting a computer and a printer discrete from the computer in said case so that the computer and the printer can be operatively connected together and used without removal thereof from said case;

paper storage means disposed in said case for receiving folded paper and guiding the folded paper as it is unfolded and withdrawn by the printer during a printing operation while the printer is supported in said case, said insert means comprising a plurality of foam inserts which cooperate to define said paper storage means and position the computer and the printer in said case, said inserts including a pair of spaced-apart computer support members disposed adjacent opposite inner walls of said case, said computer support members defining therebetween said paper storage means, a printer support member disposed between said opposite inner walls of said case, a separator member along said opposite inner walls of said case and along opposite inner end walls of said case, said separator member being disposed between each of said computer support members and said opposite inner walls of said case and having a height in a direction perpendicular to a bottom surface of said case greater than the height in said direction of said computer support members, said separator member also being disposed between said printer support member and at least one of said inner end walls of said case, said separator member having an upper surface thereof separated from said bottom surface of said case by a distance greater than the distance between the upper surface of said printer support member and said bottom surface of said case.

* * * * *